United States Patent Office 2,969,379
Patented Jan. 24, 1961

2,969,379

ANDROSTANE-11β,17β-DIOL AND THE 17-ESTERS THEREOF

John C. Babcock, Portage Township, Kalamazoo County, and Arnold C. Ott, Muskegon, Mich., assignors to The Upjohn Company, Kalamazoo, Mich., a corporation of Delaware No Drawing. Filed Jan. 9, 1959, Ser. No. 785,797

3 Claims. (Cl. 260—397.5)

This invention relates to novel androstanes and, more particularly, to androstane-11β,17β-diol and 17-esters thereof.

The novel compounds of this invention can be represented by the following formula:

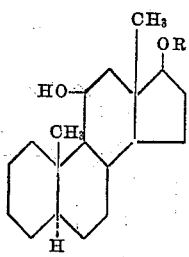

wherein R is hydrogen or the acyl radical of an organic carboxylic acid, preferably a hydrocarbon carboxylic acid containing from one to twelve carbon atoms inclusive. These compounds exhibit significant oral anabolic activity and possess the added advantage of having little or no oral androgenic activity at the same dosage level. Their effects on the central nervous system include muscle relaxant and sleep potentiation activities. The corresponding 17α-hydroxy and acyloxy compounds are distinguishable from the compounds of this invention in exhibiting little or no oral anabolic or sleep potentiation activity.

In view of the marked loss of activity incident to 11-oxygenation of many hormones, e.g., testosterone, the physiological activity of the 11-oxygenated steroids of the present invention is particularly surprising. Furthermore, a 3-oxygenated function has been heretofore believed vital to the activity of 11-oxygenated steroids. It has been found, however, that the 3-deoxy-11-oxygenated steroids of the present invention possess marked and unexpected physiological activity.

The novel compounds of the present invention can be produced from a variety of steroids. For example, the 3-benzyl thioenol ether of 11-keto-progesterone can be reduced with deactivated Raney nickel to produce the 3,5-pregnadiene-11,20-dione. The diene system of the said steroid can then be hydrogenated to produce allopregnane-11,20-dione. Removal of the side chain of the said 11,20-dione can be accomplished by formation of the 17(20)-enol ester followed by ozonolysis thereof to produce androstane-11,17-dione. Reduction of this compound gives the androstane-11β,17β-diol of the present invention.

Alternatively, starting with 11β,17β-dihydroxy-androstan-3-one and performing a Wolff-Kishner reduction of the 3-keto group, or by preparing the thio-ketal or the thio-enol ether and reducing by known methods, there is produced the said androstane-11β,17β-diol of this present invention.

The 17-hydroxy group of androstane-11β,17β-diol can be selectively esterified to produce a 17β-acyloxyandrostane-11β-ol, wherein the acyl radical is that of an organic carboxylic acid, preferably a hydrocarbon carboxylic acid containing from one to twelve carbon atoms, inclusive.

The following preparations and examples are illustrative of the products of the present invention and methods for their production but are not to be construed as limiting.

PREPARATION 1

3,5-pregnadiene-11,20-dione

A mixture of 18 g. of freshly prepared W-4 Raney nickel catalyst and 250 ml. of acetone was refluxed for 1 hour. To the solution was then added 1.8 g. of the 3-benzyl thioenol ether of 11-ketoprogesterone (U.S. Patent 2,698,852) and the mixture was refluxed for 4 more hours. The cooled solution was filtered and the filtrate distilled at reduced pressure until crystallization of the product occurred. The crystals thus obtained were recrystallized from a mixture of acetone and heptane to give 3,5-pregnadiene-11,20-dione melting at 138 to 142° C. A second crystallization of these crystals raised the melting point to 141.5 to 143° C. This product had an $E_{228}$ of 17,200, an $E_{234}$ of 18,200, an $E_{242}$ of 11,315, an $[\alpha]_D^{23}$ of plus 41° in chloroform and the following analysis:
Calculated for $C_{21}H_{28}O_2$: C, 80.73; H, 9.03. Found: C, 80.59; H, 9.13.

PREPARATION 2

Allopregnane-11,20-dione

A solution of 2.5 g. of 3,5-pregnadiene-11,20-dione in 100 ml. of ethyl acetate containing 1.25 g. of a 5% palladium on charcoal catalyst was shaken in a hydrogen atmosphere. The theoretical uptake was rapid and complete. The solution was then filtered and the filtrate distilled to a small volume and then diluted with methanol until crystallization commenced. There was thus obtained 1.72 g. of allopregnane-11,20-dione as plates which melted at 139.5 to 141° C., had an $[\alpha]_D$ of plus 122° in chloroform and the analysis below.
Calculated for $C_{21}H_{32}O_2$: C, 79.69; H, 10.19. Found: C, 79.60; H, 9.97.

PREPARATION 3

Androstane-11,17-dione

A solution of 1.2 g. of allopregnane-11,20-dione in 150 ml. of acetic anhydride containing 0.75 g. of paratoluenesulfonic acid was slowly distilled over a period of 4 hours to about half its original volume. The remaining acetic anhydride was then distilled at reduced pressure. The residual dark oil of the enol acetate of allopregnane-11,20-dione was dissolved in methylene chloride. The solution was washed free of acid with aqueous sodium bicarbonate and then evaporated to dryness. The residue was dissolved in 200 ml. of ethyl acetate and the resulting solution was cooled to about 0° C. and then ozonized with 4.9 millimoles of ozone. The solution was then mixed with 50 ml. of acetic acid and 5 g. of zinc dust for 2 hours. The mixture was filtered and the ethyl acetate solution washed with aqueous sodium bicarbonate and then with water and finally dried. The dry solution was evaporated to dryness, leaving a pale yellow oil which was purified by chromatography over a column of Florisil (synthetic magnesium silicate). The column was developed with 1-liter portions of solvents of the following composition and in the following order: 5 of petroleum ether, 1 of petroleum ether plus 1.5% acetone, 1 of petroleum ether plus 2% acetone, 1 of petroleum ether plus 2.5% acetone, and 1 of petroleum ether plus 5% acetone. The petroleum ether plus 2% acetone eluates contained a thin oil which resisted crystallization. This oil was heated with 3% methanolic sodium hydroxide and the mixture was freed of solvent and then mixed with water to give androstane-11,17-dione which, after crystallization from methanol and water, was obtained as either flat needles or plates melting at 129 to 129.5° C. These crystals had an $[\alpha]_D^{23}$ of plus 139° in chloroform and the following analysis:

Calculated for $C_{19}H_{28}O_2$: C, 79.12; H, 9.78. Found: C, 79.67; H, 10.05.

EXAMPLE 1

*Androstane-11β,17β-diol*

To a solution of 100 mg. of lithium aluminum hydride in 20 ml. of absolute ether is added a solution of 200 mg. of androstane-11,17-dione in 20 ml. of ether. The mixture is stirred under reflux for one hour and 2 ml. of ethyl acetate is added followed by 20 ml. of cold 1 N hydrochloric acid. The mixture is separated and the acid layer extracted several times with ether. The combined ether layers are washed with water, dried over sodium sulfate, and evaporated to dryness to give a residue of androstane-11β,17β-diol. The residue is recrystallized from methanol-water mixtures to give substantially pure androstane-11β,17β-diol melting at 168 to 170° C., $[\alpha]_D$ plus 28° (chloroform).

EXAMPLE 2

*Androstane-11β,17β-diol 17-acetate*

A solution of 4 g. of androstane-11β,17β-diol in a mixture of 8 ml. of acetic anhydride and 8 ml. of dry pyridine was maintained at about 25° C. for about 16 hours. The excess acetic anhydride was then decomposed with excess ice water and the resulting precipitate filtered and washed with water to give androstane-11β,17β-diol 17-acetate, melting at 139.5 to 140° C., and having $[\alpha]_D$ plus 8° in chloroform and the following analysis:

Calculated for $C_{21}H_{31}O_3$: C, 75.40; H, 10.25. Found: C, 75.46; H, 10.33.

Similarly, androstane-11β,17β-diol is converted to other androstane-11β,17β-diols 17-acylates by esterification of the 17α-hydroxy group, e.g., by reaction with the appropriate acid anhydride, acid chloride or bromide, ester by ester exchange, acid in the presence of an esterification catalyst, etc. Examples of such 17-acylates that are so prepared include those wherein the acyl group is the acyl radical of, for example, a lower-aliphatic acid, e.g., formic, propionic, butyric, isobutyric, valeric, isovaleric, trimethylacetate, 2-methylbutyric, 3-ethylbutyric, hexanoic, diethylacetic, triethylacetic, heptanoic, octanoic, α-ethylisovaleric, cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, etc., or a dibasic acid (which can be converted to water soluble, e.g., sodium, salts), e.g., succinic, glutaric, α-methylglutaric, β-methylglutaric, β,β-dimethylglutaric, adipic, pimelic, subaric, etc.

This application is a continuation-in-part of copending application Serial No. 523,390, filed July 20, 1955, now Patent No. 2,881,188.

It is to be understood that the invention is not to be limited to the exact details of operation or exact compounds shown and described, as obvious modifications and equivalents will be apparent to those skilled in the art; the invention is therefore to be limited only by the scope of the appended claims.

We claim:

1. A compound of the following formula:

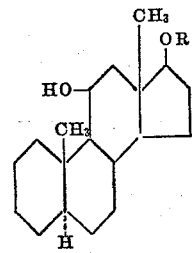

wherein R is a member selected from the group consisting of hydrogen and the acyl radical of a hydrocarbon carboxylic acid containing from one to twelve carbon atoms, inclusive.

2. Androstane-11β,17β-diol.
3. Androstane-11β,17β-diol 17-acetate.

References Cited in the file of this patent

UNITED STATES PATENTS

| | | |
|---|---|---|
| 2,863,885 | Babcock | Dec. 9, 1958 |
| 2,878,267 | Szpilfogel et al. | Mar. 17, 1959 |
| 2,881,188 | Babcock et al. | Apr. 7, 1959 |